United States Patent
Huang et al.

(10) Patent No.: US 12,184,318 B2
(45) Date of Patent: Dec. 31, 2024

(54) RADIO FREQUENCY SWITCH

(71) Applicant: RichWave Technology Corp., Taipei (TW)

(72) Inventors: Yu-Siang Huang, Taipei (TW); Chih-Sheng Chen, Taipei (TW)

(73) Assignee: RichWave Technology Corp., Taipei (TW)

( * ) Notice: Subject to any disclaimer, the term of this patent is extended or adjusted under 35 U.S.C. 154(b) by 325 days.

(21) Appl. No.: 17/688,916

(22) Filed: Mar. 8, 2022

(65) Prior Publication Data

US 2023/0198565 A1 Jun. 22, 2023

(30) Foreign Application Priority Data

Dec. 17, 2021 (TW) ................. 110147316

(51) Int. Cl.
*H04B 1/16* (2006.01)
*H04B 1/18* (2006.01)
*H04B 1/44* (2006.01)

(52) U.S. Cl.
CPC ............. *H04B 1/1615* (2013.01); *H04B 1/18* (2013.01); *H04B 1/44* (2013.01)

(58) Field of Classification Search
CPC .... H04B 17/102; H04B 17/103; H04B 17/12; H04B 17/18; H04B 17/19; H04B 1/406; H04B 1/525
USPC ...................................... 455/552.1
See application file for complete search history.

(56) References Cited

U.S. PATENT DOCUMENTS

| | | | |
|---|---|---|---|
| 6,653,697 B2 | 11/2003 | Hidaka | |
| 10,200,027 B1 * | 2/2019 | Kim | H03K 17/161 |
| 10,291,223 B2 | 5/2019 | Prevost | |
| 2016/0285447 A1 * | 9/2016 | Krishnamurthi | H03K 17/693 |
| 2020/0358427 A1 | 11/2020 | Weale | |

FOREIGN PATENT DOCUMENTS

| | | |
|---|---|---|
| CN | 109936355 A | 6/2019 |
| CN | 113285697 A | 8/2021 |
| CN | 113595542 A | 11/2021 |
| CN | 108736866 B | 12/2021 |
| CN | 115021737 A | 9/2022 |
| TW | M355469 U1 | 4/2009 |

(Continued)

OTHER PUBLICATIONS

Office action mailed on Sep. 13, 2023 for the Taiwan application No. 111147801, filing date Dec. 13, 2022, pp. 1-10., Sep. 13, 2023.

(Continued)

*Primary Examiner* — Ajibola A Akinyemi
(74) *Attorney, Agent, or Firm* — Winston Hsu

(57) ABSTRACT

A radio frequency (RF) switch includes a signal terminal, a reference voltage terminal and a shunt switch path. The shunt switch path includes a first sub-shunt circuit and a second sub-shunt circuit. The second sub-shunt circuit includes a first transistor and a second transistor coupled in parallel. When switched to a first state, the RF switch has first impedance; when switched to a second state, the RF switch has second impedance; and when switched to a third state, the RF switch has third impedance. The first impedance, the second impedance, and the third impedance are different.

20 Claims, 7 Drawing Sheets

(56) References Cited

FOREIGN PATENT DOCUMENTS

TW    I693742 B     5/2020
WO    2011/149596 A1   12/2011

OTHER PUBLICATIONS

Office action mailed on Jul.7, 2023 for the Taiwan application No. 111147801, filing date Dec. 13, 2022, pp. 1-11., Jul. 7, 2023.
Huang, the specification, including the claims, and drawings in the U.S. Appl. No. 18/372,681, filed Sep. 25, 2023.
Office action mailed on May 24, 2022 for the Taiwan application No. 110147316, filing date Dec. 17, 2021, pp. 1-5, May 24, 2022.

\* cited by examiner

RADIO FREQUENCY SWITCH

TECHNICAL FIELD

The present invention relates to a RF circuit, and in particular, to a RF switch of a RF circuit.

BACKGROUND

Radio frequency (RF) switches may direct RF signals via one or more transmission paths, and are widely used in televisions, mobile phones, wireless communication devices, WiFi devices, Bluetooth devices and satellite communication devices.

However, in the related art, the RF signal will be reflected when the RF switch is turned off, resulting in an abnormal operation of the RF switch.

SUMMARY

According to an embodiment of the invention, a radio frequency (RF) switch includes a signal terminal, a reference voltage terminal and a shunt switch path. The shunt switch path includes first sub-shunt circuit and a second sub-shunt circuit. The second sub-shunt circuit includes a first transistor and a second transistor coupled in parallel. When switched to a first state, the RF switch has first impedance; when switched to a second state, the RF switch has second impedance; and when switched to a third state, the RF switch has third impedance. The first impedance, the second impedance, and the third impedance are different.

DETAILED DESCRIPTION

Figure 1:
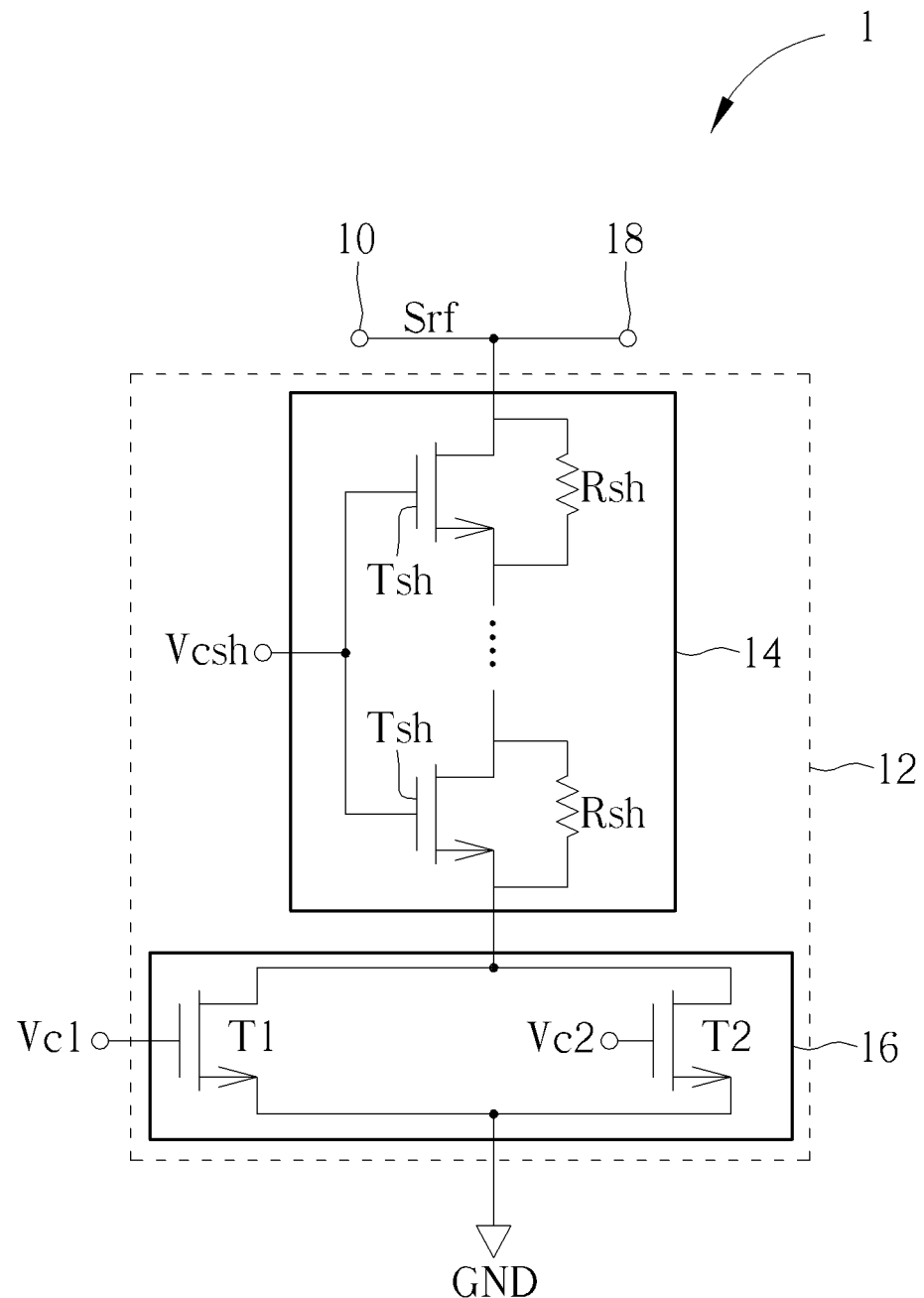
FIG. 1 is a schematic diagram of a radio frequency (RF) switch according to an embodiment of the invention.

Below, exemplary embodiments will be described in detail with reference to accompanying drawings so as to be easily realized by a person having ordinary knowledge in the art. The inventive concept may be embodied in various forms without being limited to the embodiments set forth herein. Descriptions of well-known parts are omitted for clarity, and like reference numerals refer to like elements throughout.

FIG. 1 is a schematic diagram of a radio frequency (RF) switch 1 according to an embodiment of the invention. The RF switch 1 may transmit or receive an RF signal Srf.

The RF switch 1 includes a signal terminal 10, a reference voltage terminal GND, a shunt switch path 12, and a signal terminal 18. The shunt switch path 12 is coupled to the signal terminal 10 and the reference voltage terminal GND. The signal terminal 10 may be coupled to one of an antenna and an RF circuit, and the signal terminal 18 may be coupled to the other one of the antenna and the RF circuit. The reference voltage terminal GND may provide a reference voltage such as 0V. When the RF switch 1 is turned on, the shunt switch path 12 is disconnected to cut off coupling between the signal terminal 10 and the reference voltage terminal GND, so as to enable transmission of the RF signal Srf between the signal terminal 10 and the signal terminal 18. When the RF switch 1 is turned off, the shunt switch path 12 is connected to establish coupling between the signal terminal 10 and the reference voltage terminal GND, so as to direct the RF signal Srf to the reference voltage terminal GND. In the embodiment, the RF switch 1 may selectively provide equivalent resistance substantially equal to a load resistance in a corresponding state. The load resistance may be equivalent resistance of the antenna and/or the RF circuit, such as 50 ohms or 75 ohms.

The shunt switch path 12 includes a sub-shunt circuit 14 and a sub-shunt circuit 16. The sub-shunt circuit 14 includes a first terminal coupled to the signal terminal 10 and the signal terminal 18, a second terminal, and a control terminal configured to receive a control voltage Vcsh to control the sub-shunt circuit 14. The sub-shunt circuit 16 includes a first terminal coupled to the second terminal of the sub-shunt circuit 14, and a second terminal coupled to the reference voltage terminal GND. The sub-shunt circuit 14 may include N stacked transistors Tsh, where N is a positive integer. The size of the N stacked transistors Tsh may be equal, and the conduction states thereof may be controlled by the control voltage Vcsh. The number N of the transistors Tsh in the sub-shunt circuit 14 may be determined by the power of the RF signal Srf. For example, the larger the power of the RF signal Srf is, the larger the number N of the transistors Tsh in the sub-shunt circuit 14 needs to be, so as to provide sufficient isolation during transmitting or receiving the RF signal Srf. In some embodiments, the number N of the transistors Tsh may be 24. The sub-shunt circuit 14 may further include N resistors Rsh, wherein each resistor Rsh is coupled to the first terminal and the second terminal of a corresponding stacked transistor Tsh, and the resistances of the N resistors Rsh may be equal. When the shunt switch path 12 is disconnected, the N stacked transistors Tsh are all turned off, and each transistor Tsh may be equivalent to a capacitor. When the shunt switch path 12 is connected, the N stacked transistors Tsh are all turned on. Each transistor Tsh may be equivalent to a resistor having very small resistance substantially equal to 0 ohm. In some embodiments, the 24 transistors Tsh may have equivalent resistance of 48 ohms when turned on, and the shunt switch path 12 may have an equivalent resistance of 50 ohms. In an example, the resistor Rsh may be used as a bias resistor to stabilize the voltages at the first terminal and the second terminal of the transistor Tsh in the connected shunt switch path 12. The resistance of the resistor Rsh may range between 10 K ohms and 50 K ohms. In some embodiments, the resistance of the resistor Rsh may be selected so that when the transistor Tsh is turned off, the impedance of the equivalent capacitance of the transistor Tsh is much smaller than the impedance of the resistor Rsh in the sub-shunt circuit 14.

The sub-shunt circuit 16 includes a transistor T1 and a transistor T2 coupled in parallel. The transistor T1 may include a first terminal coupled to the first terminal of the sub-shunt circuit 16, a second terminal coupled to the second terminal of the sub-shunt circuit 16, and a control terminal configured to receive a control voltage Vc1 to control the conduction state of the transistor T1. The transistor T2 may include a first terminal coupled to the first terminal of the sub-shunt circuit 16, a second terminal coupled to the second terminal of the sub-shunt circuit 16, and a control terminal configured to receive a control voltage Vc2 to control the conduction state of the transistor T2. The size of the transistor T1, the size of the transistor T2, and the size of the transistor Tsh may be different. In some embodiments, the size of the transistors Tsh may exceed the size of the transistor T1, and the size of the transistor T1 may exceed the size of the transistor T2. In some embodiments, the size of the transistors Tsh may be equal to a sum of the size of the transistor T1 and the size of the transistor T2. In some embodiments, the size of the transistor T2 may be selected for the shunt switch path 12 to exhibit an on-resistance close to the load resistance when the transistor T2 is turned on. For example, the on-resistance of the transistor T2 may be selected to be between 30 ohms and 50 ohms, so that the equivalent resistance of the shunt switch path 12 is substantially equal to 50 ohms when the N stacked transistors Tsh and the transistor T2 are turned on. In some embodiments, a size ratio of the transistor T1 to the transistor T2 may be between 70:30 and 99:1. For example, the size ratio of the transistor Tsh, the transistor T1, and the transistor T2 may be 100:99:1. Since the size of the transistor Tsh and the size of the transistor T1 are much larger than the size of the transistor T2, when the transistor Tsh and/or the transistor T1 is turned on, the transistor Tsh and/or the transistor T1 may be regarded as a short circuit. In some embodiments, when the shunt switch path 12 is connected, the RF signal Srf may be directed to the reference voltage terminal GND via the 24 transistors Tsh (0 ohm) and the transistor T2 (50 ohms), generating almost no reflection while maintaining the signal quality. In other embodiments, when the shunt switch path 12 is connected, the RF signal Srf may be directed to the reference voltage terminal GND via the 24 transistors Tsh (0 ohm) and the transistor T1 (0 ohm). The transistors Tsh, T1 and T2 may be, but are not limited to, N-type metal-oxide-semiconductor field-effect transistors (MOSFET).

In some embodiments, the sizes of the transistors Tsh, T1 and T2 may be positively correlated to finger widths of the transistors Tsh, T1, and T2, respectively. For example, in an embodiment, the size ratio of the transistors Tsh, T1 and T2 may be 100:99:1, the finger width of the transistors Tsh may be 10 micrometers, the number of the fingers of the transistors Tsh may be 100, the finger width of the transistors T1 may be 9.9 micrometers, and the number of the fingers of the transistors T1 may be 100, and the finger width of the transistor T2 may be 0.1 micrometers and the number of fingers of the transistor T2 may be 100. Therefore, the size of the transistor Tsh may be 10 micrometers*100 fingers, the size of the transistor T1 may be 9.9 micrometers*100 fingers, and the size of the transistor T2 may be 0.1 micrometers*100 fingers. In other embodiments, the sizes of transistors Tsh, T1, and T2 may be positively correlated to the number of fingers of the transistors Tsh, T1, and T2, respectively, so as to provide a simple circuit layout and better electrostatic discharge (ESD) characteristics. For example, the finger width of the transistors Tsh may be 10 micrometers and the number of fingers of the transistors Tsh may be 100, the finger width of the transistor T1 may be 10 micrometers, and the number of fingers of the transistor T1 may be 99, and the finger width of the transistor T2 may be 10 micrometers, the number of fingers of the transistor T2 may be 1. Therefore, the size of the transistors Tsh may be 10 micrometers*100 fingers, the size of the transistors T1 may be 10 micrometers*99 fingers, and the size of the transistors T2 may be 10 micrometers*1 finger.

The RF switch 1 may be switched to one of the states S0 to S3 shown in Table 1:

TABLE 1

| State | Vcsh(V) | Vc1(V) | Vc2(V) | Impedance (ohms) |
|---|---|---|---|---|
| S0 | −2.5 | 2.5 | 2.5 | 1/jw(Coff/N) |
| S1 | −2.5 | −2.5 | −2.5 | 1/jw(Coff/(N + 1)) |
| S2 | 2.5 | 2.5 | 2.5 | 0 |
| S3 | 2.5 | −2.5 | 2.5 | 50 |

As shown in Table 1, when the RF switch 1 is switched to the state S0, the sub-shunt circuit 14 receives-2.5V to be turned off and the transistor T1 and the transistor T2 receive 2.5V to be turned on, for the RF switch 1 to provide an impedance Z0 equal to 1/jw(Coff/N), where Coff is the equivalent capacitance when each transistor Tsh is turned off, and N is the number of the transistors Tsh. When the RF switch 1 is switched to the state S1, the sub-shunt circuit 14 receives-2.5V to be turned off and the transistor T1 and the transistor T2 also receive-2.5V to be turned off, for the RF switch 1 to provide an impedance Z1 equal to 1/jw (Coff/(N+1)). When the RF switch 1 is switched to the state S2, the sub-shunt circuit 14 receives 2.5V to be turned on and the transistor T1 and the transistor T2 receive 2.5V to be turned on, for the RF switch 1 to provide an impedance Z2 equal to 0 ohm. When the RF switch 1 is switched to state S3, the sub-shunt circuit 14 receives 2.5V to be turned on, the transistor T1 receives-2.5V to be turned off, and the transistor T2 receives 2.5V to be turned on, for the RF switch 1 to provide an impedance Z3 equal to 50 ohms. That is, the impedances Z0 to Z3 are all different, and one of them may be equal to 50 ohms. The impedance Z3 may be matched to the load resistance. For example, the impedance Z3 may be approximately 50 ohms or 75 ohms. The impedance Z1 may exceed the impedance Z3, and the impedance Z3 may exceed the impedance Z2. The states S0 and S1 may be used when the RF switch 1 is turned on, and the states S2 and S3 may be used when the RF switch 1 is turned off. When the RF switch 1 is switched to the state S3 to be turned off, since the RF signal Srf is directed to the reference voltage terminal GND via the impedance Z3 matching the load resistance, there will be almost no reflection to degrade the signal quality.

While the table 1 shows that-2.5V is used to turn off the sub-shunt circuit 14, the transistor T1 and/or the transistor T2, those skilled in the art would recognize that other voltages less than-2.5V may be used to turn off the sub-shunt circuit 14, the transistor T1, and/or the transistor T2. In addition, while the table 1 shows that 2.5V is used to turn on the sub-shunt circuit 14, the transistor T1, and/or the transistor T2, those skilled in the art would recognize that other voltages exceeding the corresponding threshold voltages of the transistor Tsh, the transistor T1, and/or the transistor T2 may be used to turn on the sub-shunt circuit 14, the transistor T1, and/or the transistor T2. In some embodiments, the control voltages Vc1 and Vc2 may be varied for the transistors T1 and T2 to generate desired impedances in the states S0 to S3.

The RF switch 1 may provide an equivalent resistance substantially equal to the load resistance when turned off, enhancing the signal quality without increasing or barely increasing the circuit area.

Figure 2:
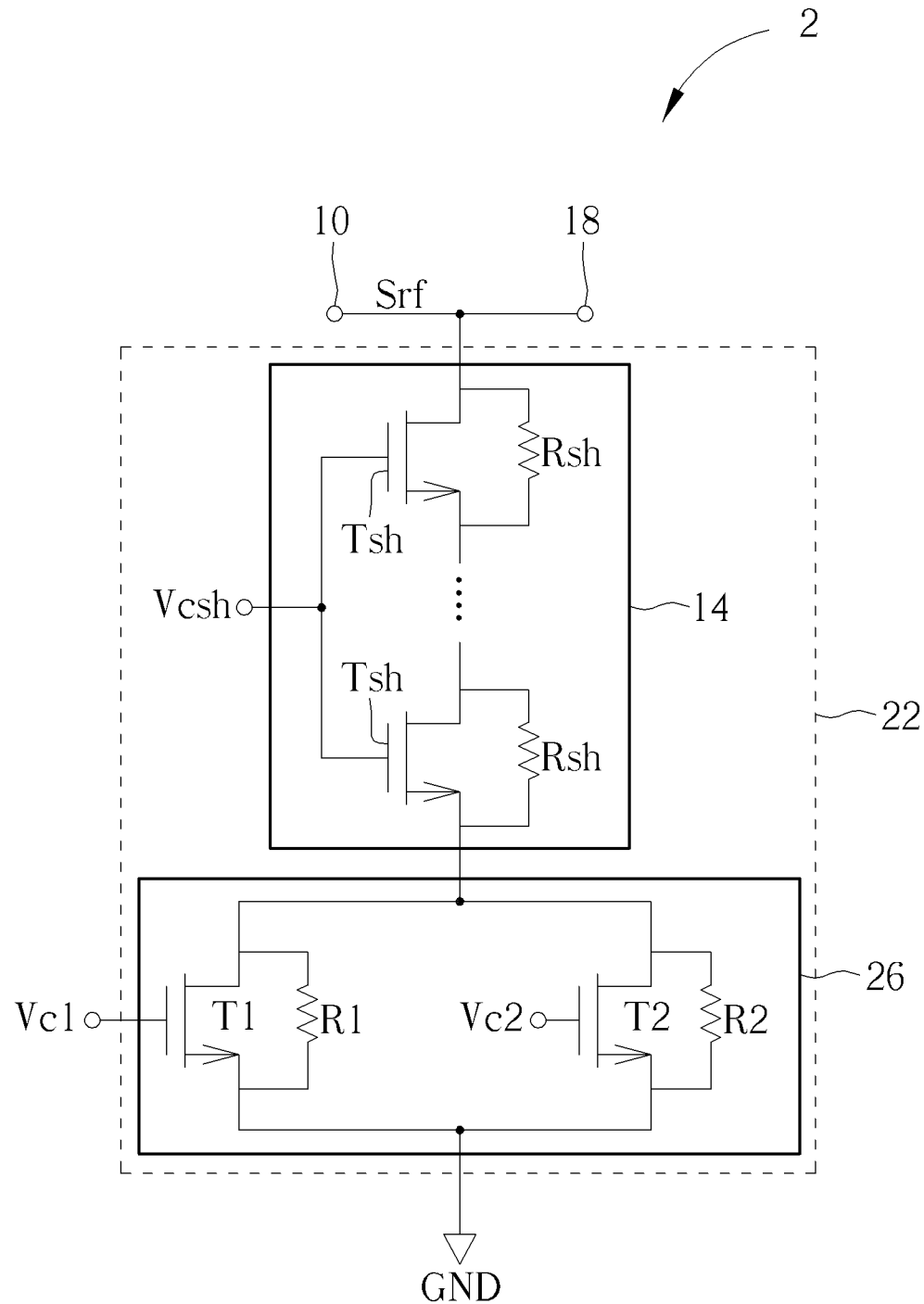
FIG. 2 is a schematic diagram of an RF switch according to another embodiment of the invention.

FIG. 2 is a schematic diagram of an RF switch 2 according to another embodiment of the invention. The RF switch 2 and the RF switch 1 are different in that in a sub-shunt circuit 26 in the shunt switch path 22, the transistor T1 and the transistor T2 are coupled in parallel to a resistor R1 and a resistor R2, respectively. When the shunt switch path 22 is disconnected, the resistor R1 may be used as a bias resistor to stabilize the voltages at the first terminal and the second terminal of the transistor T1, and the resistor R2 may be used as a bias resistor to stabilize voltages at the first terminal and the second terminal of the transistor T2. The operation of the RF switch 2 is similar to that of the RF switch 1, and the explanation therefor will not be repeated here for brevity.

Figure 3:
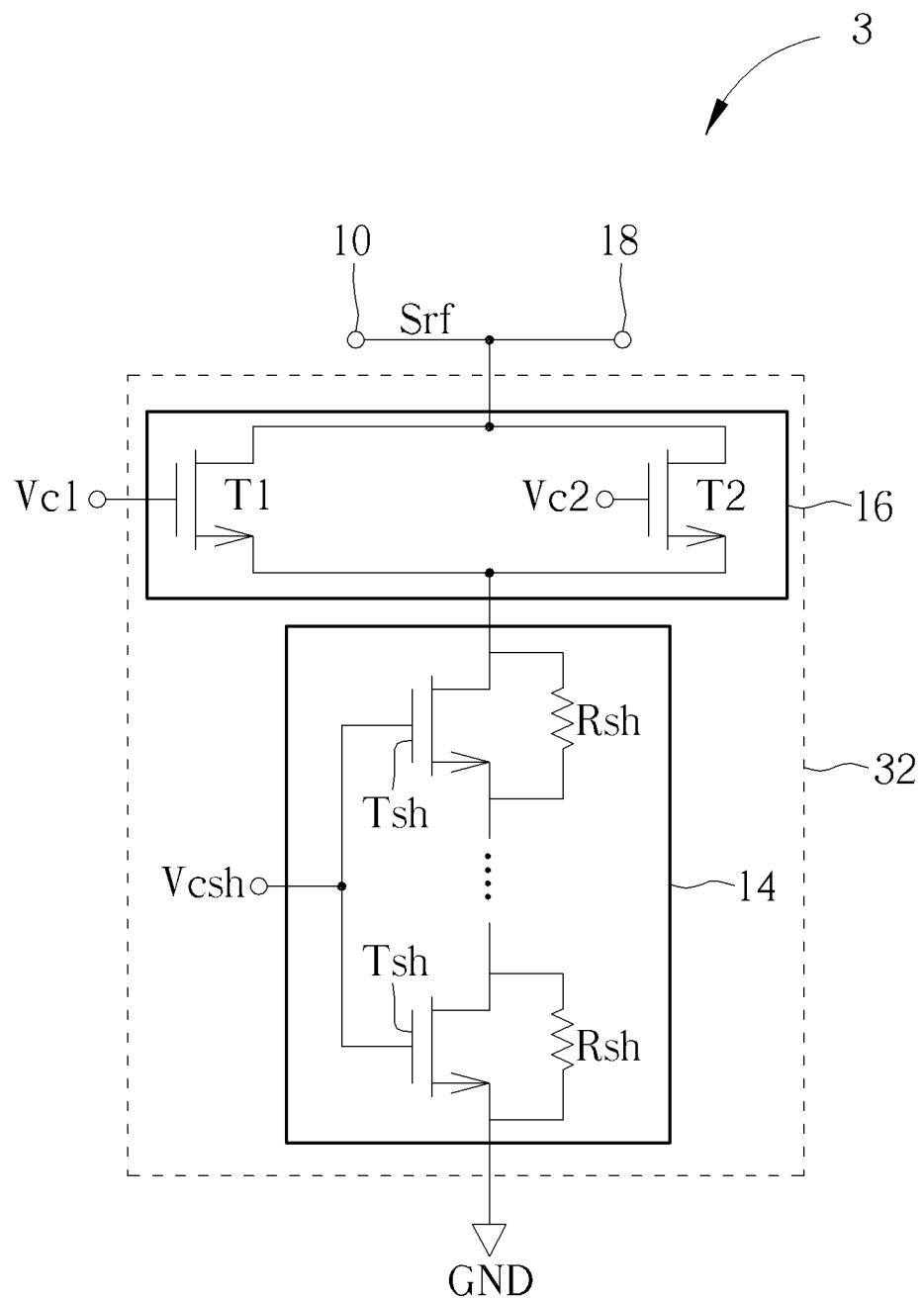
FIG. 3 is a schematic diagram of an RF switch according to another embodiment of the invention.

FIG. 3 is a schematic diagram of an RF switch 3 according to another embodiment of the invention. The RF switch 3 and the RF switch 1 are different in that the sub-shunt circuit 14 and the sub-shunt circuit 16 of a shunt switch path 32 exchange positions in the RF switch 3. The first terminal of the sub-shunt circuit 16 is coupled to the signal terminal 10 and the signal terminal 18. The first terminal of the sub-shunt circuit 14 is coupled to the second terminal of the sub-shunt circuit 16, and the second terminal of the sub-shunt circuit 14 is coupled to the reference voltage terminal GND. The operation of the RF switch 3 is similar to that of the RF switch 1, and the explanation therefor will not be repeated here for brevity.

Figure 4:
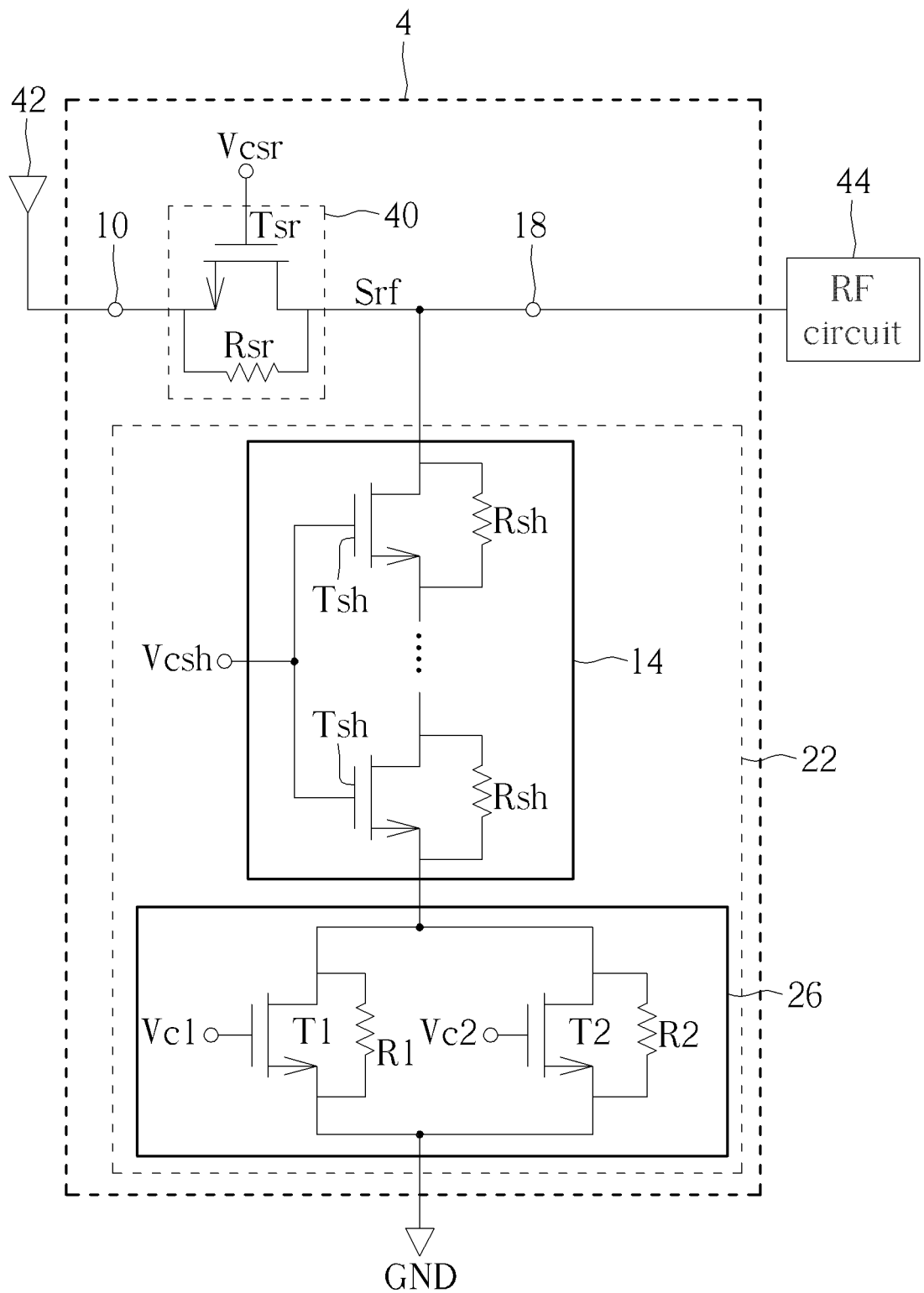
FIG. 4 is a schematic diagram of an RF switch according to another embodiment of the invention.

FIG. 4 is a schematic diagram of an RF switch 4 according to another embodiment of the invention. The RF switch 4 and the RF switch 2 are different in that the RF switch 4 further includes a series switch path 40. The series switch path 40 includes a first terminal coupled to the signal terminal 10 and a second terminal coupled to the signal terminal 18. The signal terminal 10 is further coupled to an antenna 42, and the signal terminal 18 is further coupled to an RF circuit 44. The RF circuit 44 may be a matching circuit, a power amplifier, or other circuits. When the series switch path 40 is connected, the series switch path 40 may establish coupling between the signal terminal 10 and the signal terminal 18 to transmit the RF signal Srf between the signal terminal 10 and the signal terminal 18. When the series switch path 40 is disconnected, the series switch path 40 may cut off the coupling between the signal terminal 10 and the signal terminal 18 to prevent the RF signal Srf from being transmitted between the signal terminal 10 and the signal terminal 18. The equivalent resistance of the antenna 42 and the equivalent resistance of the RF circuit 44 may be substantially equal. The series switch path 40 may include a transistor Tsr and a resistor Rsr coupled in parallel. The transistor Tsr includes a first terminal coupled to the signal terminal 10, a second terminal coupled to the shunt switch path 22 and the signal terminal 18, and a control terminal configured to receive the control voltage Vcsr to control the transistor Tsr. The resistor Rsh includes a first terminal coupled to the first terminal of the transistor Tsr, and a second terminal coupled to the second terminal of the transistor Tsr. The transistor Tsr may be an N-type MOSFET. While FIG. 4 shows that the series switch path 40 only includes one transistor Tsr and one resistor Rsr, in some embodiments, the series switch path 40 may further include M transistors Tsr and M resistors Rsr, the M transistors Tsr being sequentially stacked, each resistor Rsr being coupled to the first terminal and the second terminal of a corresponding stacked transistor Tsr, and M being a positive integer. The operation of the RF switch 4 is similar to that of the RF switch 2, and the explanation therefor will not be repeated here for brevity.

Figure 5:
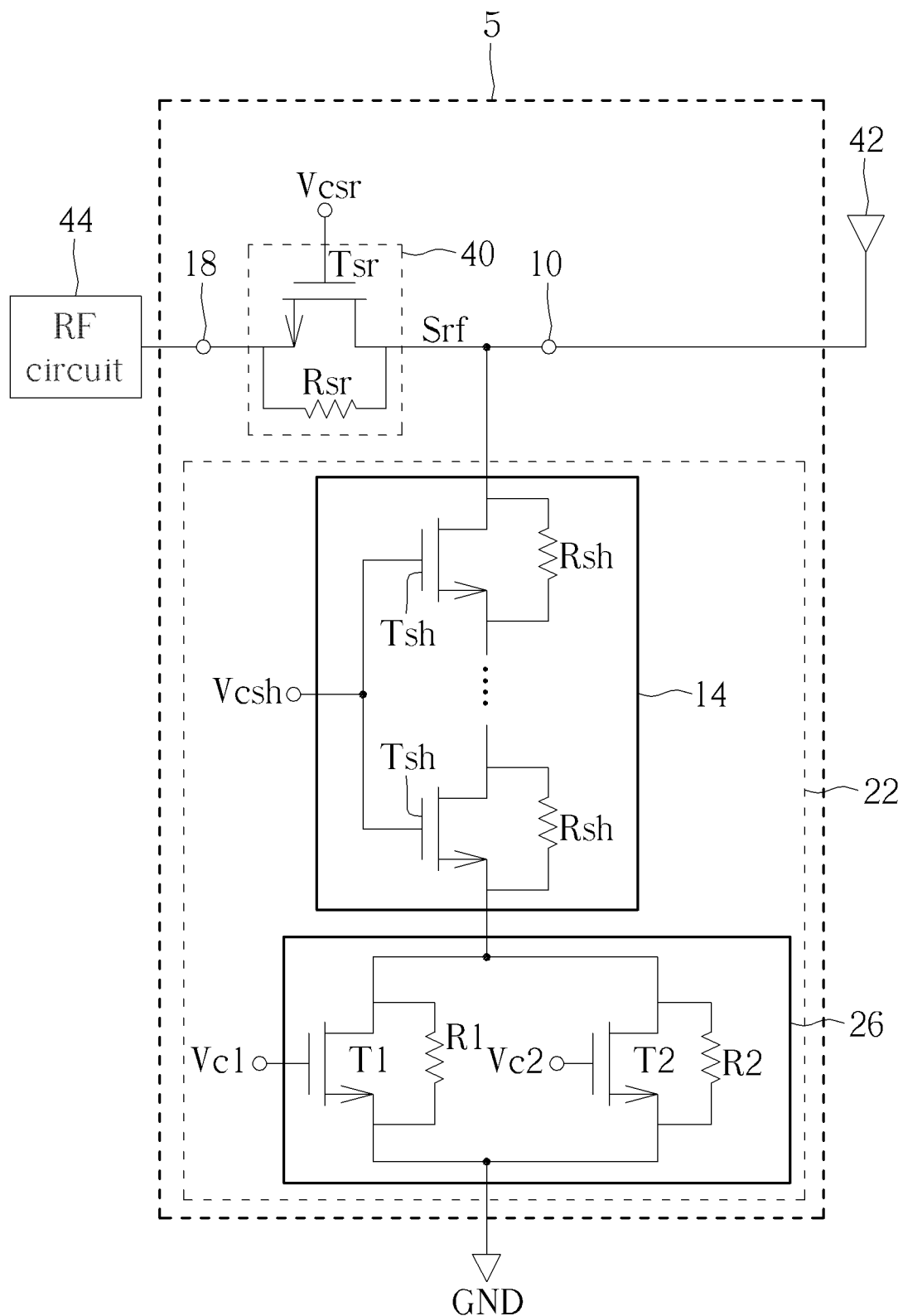
FIG. 5 is a schematic diagram of an RF switch according to another embodiment of the invention.

FIG. 5 is a schematic diagram of an RF switch 5 according to another embodiment of the invention. The RF switch 5 and the RF switch 4 are different in that the first terminal of the series switch path 40 is coupled to the signal terminal 18 and the second terminal of the series switch path 40 is coupled to the signal terminal 10 in the RF switch 5. The operation of the RF switch 5 is similar to that of the RF switch 4, and the explanation therefor will not be repeated here for brevity.

Figure 6:
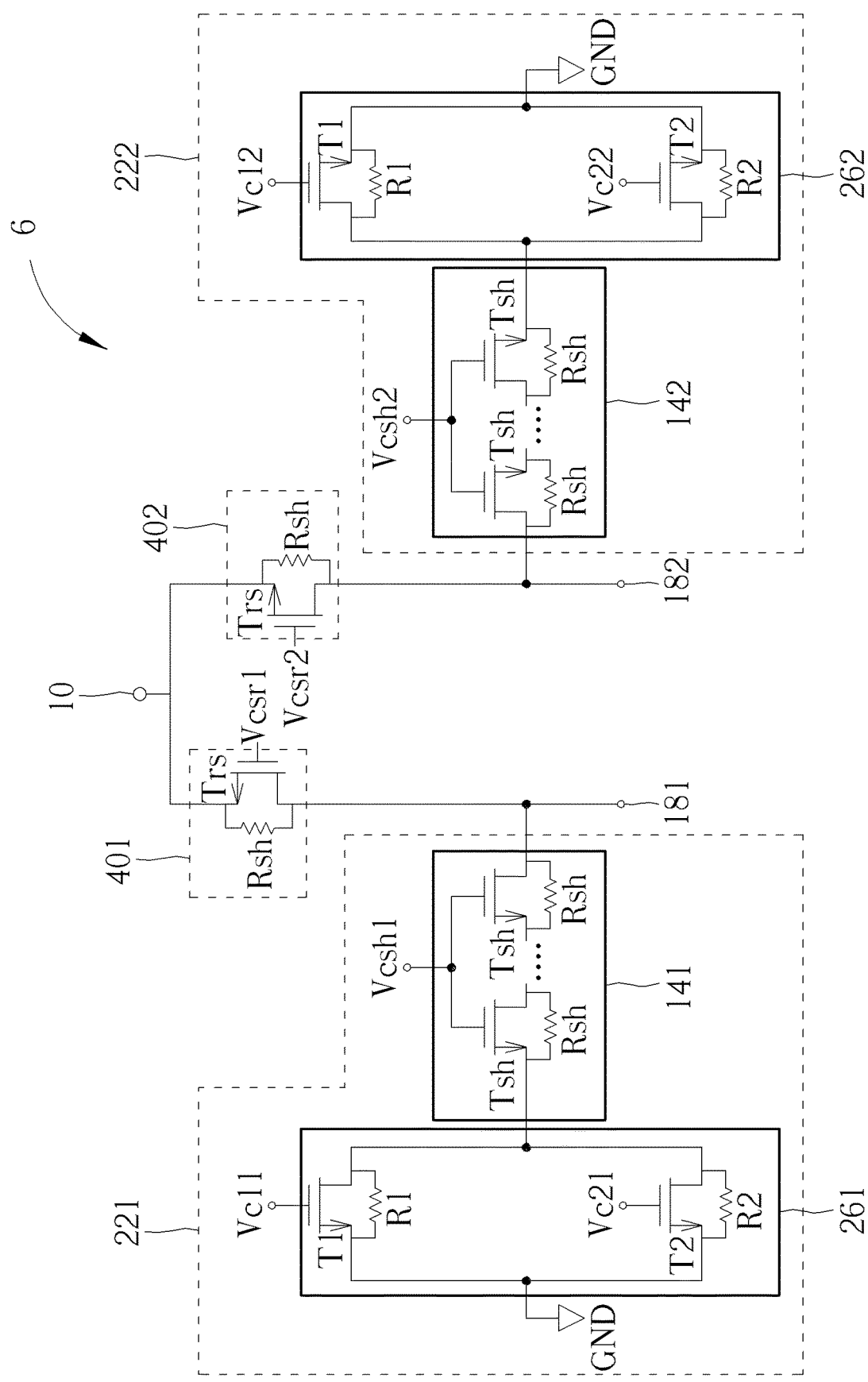
FIG. 6 is a schematic diagram of an RF switch according to another embodiment of the invention.

FIG. 6 is a schematic diagram of an RF switch 6 according to another embodiment of the invention. The RF switch 6 is a single-pole double throw (SPDT) switch. The RF switch 6 and the RF switch 4 are different in that the RF switch 6 further includes series switch paths 401 and 402, shunt switch paths 221 and 222, and signal terminals 181 and 182. The circuit configuration and operation of the series switch paths 401 and 402 are similar to the series switch path 40, and the circuit configuration and operation of the shunt switch paths 221 and 222 are similar to the shunt switch path 22, and the explanation therefor will not be repeated here for brevity. The RF switch 6 may receive the control voltages Vc11, Vc21, Vcsh1, Vcsr1, Vc12, Vc22, Vcsh2, Vcsr2 to form a conductive path between the signal terminal 10 and one of the signal terminals 181 and 182 to transmit or receive the RF signal Srf. When the RF switch 6 forms a conductive path between the signal terminal 10 and the signal terminal 181, the series switch path 401 is connected, the shunt switch path 221 is disconnected, the series switch path 402 is disconnected, and the shunt switch path 222 is connected. When the RF switch 6 forms a conductive path between the signal terminal 10 and the signal terminal 182, the series switch path 401 is disconnected, the shunt switch path 221 is connected, the series switch path 402 is connected, and the shunt switch path 222 is disconnected.

Figure 7:
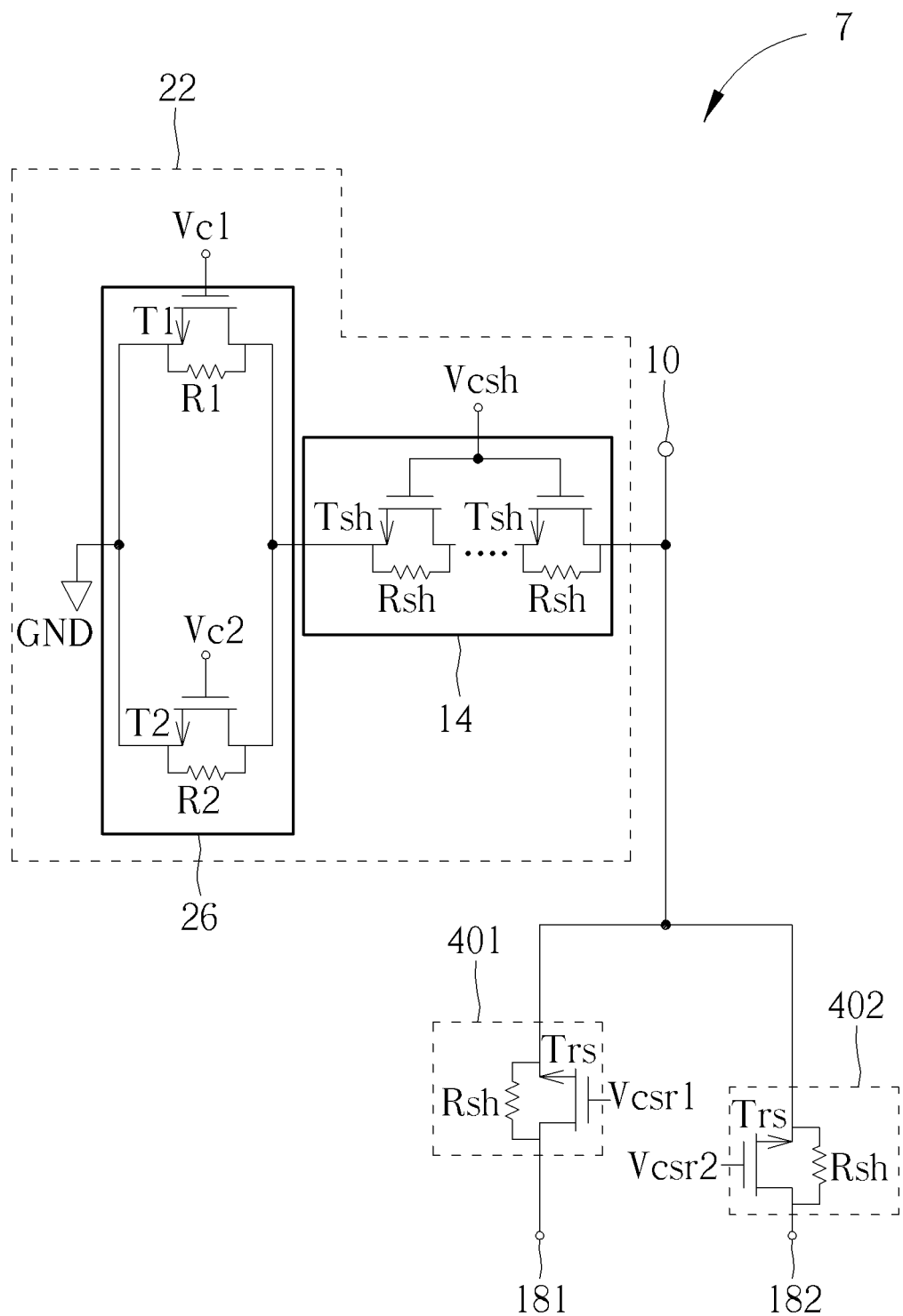
FIG. 7 is a schematic diagram of an RF switch according to another embodiment of the invention.

FIG. 7 is a schematic diagram of an RF switch 7 according to another embodiment of the invention. The RF switch 7 and the RF switch 5 are different in that the RF switch 7 further includes series switching paths 401 and 402 and signal terminals 181 and 182. The circuit configuration and operation mode of the series switch paths 401 and 402 are similar to those of the series switch path 40 and the explanation therefor will not be repeated here for brevity. The RF switch 7 may receive the control voltages Vc1, Vc2, Vcsh, Vcsr1, Vcsr2 to form a conductive path between the signal terminal 10 and one of the signal terminals 181 and 182 to transmit or receive the RF signal Srf. Alternatively, the RF switch 7 may be disabled to disconnect coupling between the signal terminal 10 and the signal terminal 181, and disconnect coupling between the signal terminal 10 and the signal terminal 182. When the RF switch 7 forms a conductive path between the signal terminal 10 and the signal terminal 181, the series switch path 401 is connected, the series switch path 402 is disconnected, and the shunt switch path 22 is disconnected. When the RF switch 7 forms a path between the signal terminal 10 and the signal terminal 182, the series switch path 401 is disconnected, the series switch path 402 is connected, and the shunt switch path 22 is disconnected. When the RF switch 7 is disabled, the series switch path 401 is disconnected, the series switch path 402 is disconnected, and the shunt switch path 22 is connected.

The RF switches 1 to 7 may provide an equivalent resistance substantially equal to the load resistance when turned off, so as to enhance the signal quality without increasing or barely increasing the circuit area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio frequency (RF) switch comprising:
   a signal terminal;
   a reference voltage terminal; and
   a shunt switch path coupled to the signal terminal and the reference voltage terminal, the shunt switch path comprising:
      a first sub-shunt circuit; and
      a second sub-shunt circuit comprising a first transistor and a second transistor coupled in parallel;
   wherein when switched to a first state, the RF switch has first impedance; when switched to a second state, the RF switch has second impedance; and when switched to a third state, the RF switch has third impedance; and the first impedance, the second impedance, and the third impedance are different.

2. The RF switch of claim 1, wherein the first sub-shunt circuit comprises a plurality of stacked transistors.

3. The RF switch of claim 2, wherein a size of the plurality of stacked transistors, a size of the first transistor and a size of the second transistor are different.

4. The RF switch of claim 3, wherein the size of the plurality of stacked transistors exceeds the size of the first transistor; and the size of the first transistor exceeds the size of the second transistor.

5. The RF switch of claim 3, wherein the size of the plurality of stacked transistors is equal to a sum of the size of the first transistor and the size of the second transistor.

6. The RF switch of claim 2, wherein the first sub-shunt circuit further comprises a plurality of resistors, and each resistor is coupled to a first terminal and a second terminal of a corresponding stacked transistor of the plurality of stacked transistors.

7. The RF switch of claim 1, wherein a size of the first transistor and a size of the second transistor are different.

8. The RF switch of claim 7, wherein the size of the first transistor exceeds the size of the second transistor.

9. The RF switch of claim 1, wherein a size ratio of the first transistor to the second transistor is 99:1.

10. The RF switch of claim 1, wherein when turned on, the second transistor has an on-resistance substantially equal to a load resistance.

11. The RF switch of claim 10, wherein the on-resistance is equal to 50 ohms.

12. The RF switch of claim 1, wherein one of the first impedance, the second impedance, and the third impedance is equal to 50 ohms.

13. The RF switch of claim 1, wherein the third impedance is matched to a load resistance.

14. The RF switch of claim 1, wherein the third impedance is substantially equal to 50 ohms or 75 ohms.

15. The RF switch of claim 1, further comprising a series switch path coupled to the signal terminal and a RF circuit.

16. The RF switch of claim 1, wherein the signal terminal is coupled to an antenna.

17. The RF switch of claim 1, wherein when the RF switch is switched to the first state, the first sub-shunt circuit is turned off, and the first transistor and the second transistor are turned off.

18. The RF switch of claim 1, wherein when the RF switch is switched to the second state, the first sub-shunt circuit is turned on, and the first transistor and the second transistor are turned on.

19. The RF switch of claim 1, wherein when the RF switch is switched to the third state, the first sub-shunt circuit is turned on, the first transistor is turned off, and the second transistor is turned on.

20. The RF switch of claim 1, wherein the first impedance exceeds the third impedance, and the third impedance exceeds the second impedance.

* * * * *